(12) United States Patent
Heirtzler et al.

(10) Patent No.: US 9,033,394 B2
(45) Date of Patent: May 19, 2015

(54) TWO STAGE GLASS POSITION FOR FRAMELESS VEHICLES

(75) Inventors: Paul L. Heirtzler, Northville, MI (US); Donald P. Iacovoni, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 194 days.

(21) Appl. No.: 13/570,598

(22) Filed: Aug. 9, 2012

(65) Prior Publication Data

US 2014/0041302 A1 Feb. 13, 2014

(51) Int. Cl.
- B60J 1/17 (2006.01)
- B60J 10/04 (2006.01)
- E05F 15/16 (2006.01)
- B60J 10/06 (2006.01)

(52) U.S. Cl.
CPC . *B60J 10/046* (2013.01); *B60J 1/17* (2013.01); *E05Y 2900/508* (2013.01); *E05F 15/1669* (2013.01); *E05Y 2400/354* (2013.01); *E05Y 2400/36* (2013.01); *E05Y 2800/12* (2013.01); *E05Y 2800/422* (2013.01); *E05Y 2900/55* (2013.01); *B60J 10/06* (2013.01)

(58) Field of Classification Search
CPC ........................................................ B60J 1/17
USPC ................... 49/72; 296/146.1, 146.2, 146.14, 296/146.16, 201; 454/70, 75, 131
See application file for complete search history.

(56) References Cited

U.S. PATENT DOCUMENTS

| | | | |
|---|---|---|---|
| 4,351,016 A * | 9/1982 | Felbinger | 361/181 |
| 4,571,884 A * | 2/1986 | Hetmann et al. | 49/72 |
| 5,810,423 A * | 9/1998 | Brackmann et al. | 296/146.2 |
| 6,166,508 A * | 12/2000 | Kalb | 318/632 |
| 6,236,176 B1 * | 5/2001 | Uebelein et al. | 318/287 |
| 6,246,195 B1 * | 6/2001 | Kloesters | 318/280 |
| 7,914,065 B2 * | 3/2011 | Sugawara | 296/146.2 |
| 8,590,210 B2 * | 11/2013 | Schindhelm et al. | 49/506 |
| 8,727,419 B2 * | 5/2014 | Syvret et al. | 296/146.2 |
| 2001/0033223 A1 * | 10/2001 | Zagler | 340/5.72 |
| 2010/0032980 A1 * | 2/2010 | Miller | 296/146.1 |
| 2012/0005963 A1 * | 1/2012 | Zellmer et al. | 49/358 |
| 2012/0136532 A1 * | 5/2012 | Konchan | 701/36 |
| 2012/0234621 A1 * | 9/2012 | Syvret et al. | 180/281 |
| 2014/0273786 A1 * | 9/2014 | Wade et al. | 454/75 |

FOREIGN PATENT DOCUMENTS

| | | | | | |
|---|---|---|---|---|---|
| JP | 03005234 A | * | 1/1991 | | B60J 1/17 |
| JP | 06227257 A | * | 8/1994 | | B60J 5/10 |

* cited by examiner

*Primary Examiner* — Glenn Dayoan
*Assistant Examiner* — Paul Chenevert
(74) *Attorney, Agent, or Firm* — Raymond Coppiellie; Price Heneveld LLP (57) ABSTRACT

A motor vehicle has an openable door and a frameless door glass system comprising a moveable glass operable in two stages of engagement with a seal. The first stage provides a vertical gap between the glass and the seal prior to the door being opened and the second stage increases the level of engagement between the glass and seal relative the first stage upon detection of a predetermined event, such as a predetermined vehicle speed.

20 Claims, 6 Drawing Sheets

TWO STAGE GLASS POSITION FOR FRAMELESS VEHICLES

FIELD OF THE INVENTION

The present invention generally relates to a two stage glass position for vehicles having frameless doors to achieve exceptional high speed wind noise performance while retaining acceptable door openability at minimal cost.

BACKGROUND OF THE INVENTION

Window and interacting roof seal assemblies for motor vehicles are generally well-known in the art. Conventional side doors for passenger vehicles include a structural member that extends around the top of the side window, typically referred to as the door frame. Among other things, the door frame provides support for glass weather seals that in turn provide support and sealing function to the door glass when it is in the up position. However, some vehicles employ so-called "frameless" door systems that do not have any structural member above the belt line to support the glass. These are typically used on vehicles with folding or removable (convertible) tops, so that when the top is stowed and the side windows are down, there is unobstructed view out of the vehicle. Frameless doors are also sometimes used on coupes and sedans to achieve certain styling objectives.

On vehicles with frameless door systems, the upper edge of the door glass typically mates with a weather seal that is mounted to the vehicle body at the forward pillar on the side of the windshield (so-called "A" pillar) and a weather seal mounted on the folding or convertible top to provide the sealing function. To maintain the ability to open and close the door without interference, the glass must be able to swing into and out of engagement with this weather seal freely. This structural limitation, however, presents challenges to achieving desired water and air leakage (wind noise) performance, particularly at high vehicle speeds (above 80 MPH). At these high speeds, aerodynamic loads on the glass tend to pull the glass away from the body, potentially reducing the seal between the glass and the weather seal (also known as glass "blow out"). Previous generations of frameless door systems relied on significant inboard preload of the glass into the body and top mounted weather seals to provide adequate sealing pressure and resistance to aerodynamic glass "blow out." However, high levels of preload can cause premature weather seal wear during glass cycling, as well as other undesirable issues.

More recent systems have adopted an "indexing" window regulator system. Generally, these systems lower the door glass a short distance when the door is opened, then fully close the glass again when the door is closed. This changes the path of the upper edge of the glass such that it avoids interference with the weather seal retainer structure and provides a vertical gap with the weather seal structure to maintain good door openability and operation, yet allows the glass and a weather seal structural member to resist aerodynamic loads on the glass. These systems usually rely on the electronics in the vehicle that control the window regulator motor in order to lower and raise the glass based on defined input trigger(s). The most common trigger mechanism for such indexing systems is a change in the door ajar switch state, which provides a true signal that the door is opening/closing and which is incorporated as a component of the hardware and electrical systems on almost every existing vehicle for actuation of courtesy lighting.

However, despite the functional improvements that indexing glass systems provide to frameless door systems, the trade-off between effective glass engagement with the weather seal structural member and door openability remained. Potential interference may occur with such indexed designs when the door is opened quickly using the outside door handle. That is, the door and glass may be moving to the open position before the glass-index trigger activation responds and the system may not respond quickly enough (due to module wake up and computational time, physical reaction of the window system, etc.) to overcome upper edge glass-to-weather seal structure interference. While it may be possible to alleviate this situation by triggering the indexing function earlier in the door opening event (i.e., activation of or proximity to the outside door handle), alternate trigger methods tend to involve sensors that add cost, complexity, and package constraints to a vehicle. It may also be possible to trigger the indexing function earlier using existing hardware by judging a customer's intent to open a door (i.e., an unlock command from a variety of sources), but these methods are not always used when opening a door, and it is not possible to predict which door will be used, so all door glass must be indexed. This may cause higher levels of wear on the window systems, as well as unintended water entry into the vehicle, as the windows would need to stay down for some set time period to allow the customer to open the door.

Another consideration with a significant upper glass edge to weather seal structure interference is door function when the glass fails to index down (i.e., door glass frozen in place due to ice, dead vehicle battery, or failure within the electrical or mechanical system). In the case of these low probability events, although higher efforts or some noise or vibration upon door opening may be acceptable, door closing effort may become an issue. On door closing, the door glass could impact the outside of the weather seal structure, potentially causing damage or failure of the glass, weather seal structure, or other components, or, at a minimum, causing a substantial water leak path.

The ideal frameless door system offers minimal door opening effort with no noise, vibration, or harshness at any door opening speed, while also providing sufficient engagement between glass and seal structure to resist aerodynamic loads under all potential glass to weather seal tolerance conditions. Hence, a glass positioning device for vehicles having frameless doors to achieve exceptional high speed wind noise performance, while retaining acceptable door openability when the vehicle is stopped at any door opening speed, while also doing so at minimal cost which overcomes these drawbacks, would be advantageous.

SUMMARY OF THE INVENTION

The window glass and interacting roof weather seal assembly of the present invention particularly overcomes the foregoing drawbacks of alternative systems by addressing the competing requirements for door openability and seal structural member engagement for high speed wind noise performance, which occur at different times during vehicle operations, and addressing these requirements separately. The present invention thus employs a frameless glass system with a two stage glass indexing system: one stage of engagement to provide good door openability and adequate sealing function with the vehicle at rest, and a second stage of engagement that adds a higher level of engagement when the vehicle is at highway speeds.

The first stage of engagement may be obtained by utilizing force limiting software programmed into the vehicle controller. Using this program, the vehicle controller stops the operably coupled window regulator and window motor assembly from further proceeding against the weather seal when an adequate force is obtained to seal the vehicle at rest or at low speeds. This results in limited seal penetration and a glass up position that is vertically disposed under and swings completely clear of the weather seal assembly structure as the door is opened, even if the indexing function were slow or disabled.

The second stage of engagement may be obtained by actuating the window regulator and window motor assembly until full stall of the window motor assembly, which is at a higher force level than the first stage of engagement. This results in a higher glass position and significantly improved engagement between the glass and seal assembly. The second stage of engagement can be initiated by a number of vehicle-based triggers, including aerodynamic pressure readings, engine-on condition, door lock activation, etc., but is preferably triggered by achieving a certain vehicle speed, preferably at the higher velocities at which wind noise becomes objectionable.

To return the system to improved door openability after application of the second stage and after the triggering event has passed, the glass height must be returned to the first stage of engagement prior to any significant potential of the door being opened. The preferred means for achieving this is to index the door glass down and reclose the window using the force limiting program. The trigger mechanism for this reset is preferably a predetermined, relatively low vehicle speed.

The benefits of the present invention are improved resistance to aerodynamic loads and good door openability in a system that is durable and contributes to a relatively quiet driving experience, without added cost and hardware.

It is therefore an aspect of the present invention to provide a motor vehicle having an openable door and a frameless door glass system comprising a moveable glass operable in two stages of engagement with a weather seal assembly and a window regulator for moving the glass up and down. The frameless door glass system is capable of detecting a force level at which the glass engages the seal assembly, wherein the first stage of engagement is obtained by preventing the window regulator from further engaging the glass with the seal assembly when a first predetermined force level is obtained between the glass and the seal assembly to provide a vertical gap between the glass and the seal assembly prior to and as the door is being opened. The second stage of engagement is obtained by actuating the window regulator to further engage the glass with the seal assembly upon detection of a first predetermined event until a second predetermined force level greater than the first predetermined force level is obtained between the glass and the seal assembly so as to increase the level of engagement between the glass and seal assembly.

Another aspect of the invention is a motor vehicle further comprising a vehicle speed measuring device and the first predetermined event is a vehicle speed above a predetermined vehicle speed, such as 10 MPH.

Still another aspect of the present invention is a motor vehicle further comprising a aerodynamic pressure measuring device and the first predetermined event is a aerodynamic pressure below a predetermined aerodynamic pressure.

Yet another aspect of the present invention is a motor vehicle further comprising a power door lock system for remotely locking and unlocking the door locks and the first predetermined event is the detection of the power door locks in the locked condition.

An additional aspect of the present invention is a motor vehicle having a frameless door glass system, where the glass system is returned to the first stage from the second stage upon the occurrence of a second predetermined event.

Another aspect of the present invention is a motor vehicle where the second predetermined event is a second predetermined vehicle speed.

Yet another aspect of the present invention is a motor vehicle where the second predetermined vehicle speed is directly measured through a speedometer or determined from aerodynamic pressure.

A still further aspect of the present invention is a motor vehicle where the second predetermined event is door unlock activation or engine off condition.

According to another aspect of the present invention, a motor vehicle has an openable door and a frameless door glass system comprising a moveable glass operable in two stages of engagement with a seal. The first stage provides a vertical gap between the glass and the seal prior to the door being opened and the second stage increases the level of engagement between the glass and seal relative the first stage upon detection of a predetermined event.

A further aspect of the present invention is a motor vehicle where the frameless door glass system further includes an operably coupled window regulator and window motor assembly for moving the glass up and down. The window regulator and window motor assembly are capable of detecting a force level at which the glass engages the seal assembly and the first stage of engagement is obtained by preventing the window regulator from further engaging the glass with the seal assembly when a first predetermined force level is obtained.

Yet another aspect of the present invention is a motor vehicle where the second stage of engagement is obtained by actuating the window regulator to further engage the glass with the seal assembly until a second predetermined force level greater that the first predetermined force level is obtained.

Still another aspect of the present invention is a motor vehicle where the second predetermined force level is obtained upon full stall of the window regulator.

A yet additional aspect of the present invention is a motor vehicle where the motor vehicle further comprises a vehicle speed measuring device for directly or indirectly measuring the vehicle speed and the predetermined event is a vehicle speed above a predetermined vehicle speed.

Another aspect of the present invention is a method for operating a moveable glass of a motor vehicle having an openable door and a frameless door glass system comprising the glass, a weather seal assembly and an operably coupled window regulator and window motor for moving the glass up and down in two stages of engagement. The method comprising the steps of applying a first force level at which the glass engages the seal assembly to obtain a first stage of engagement prior to the door being opened to provide a vertical gap between the glass and the seal assembly; and applying a second force level at which the glass engages the seal assembly, wherein the second force level is higher than the first force level, to obtain a second stage of engagement so as to increase the level of engagement between the glass and seal assembly upon detection of a predetermined event.

Still another aspect of the present invention is a method of operating a moveable glass of motor vehicle where the method further includes the step of detecting the force level at which the glass engages the seal assembly, wherein the first stage of engagement is obtained by preventing the window regulator from further engaging the glass with the seal assembly when a first predetermined force level is obtained.

Yet another aspect of the present invention is a method of operating a moveable glass of motor vehicle, wherein the second stage of engagement is obtained by actuating the window regulator to further engage the glass with the seal assembly until a second predetermined force level greater that the first predetermined force level is obtained.

These and other aspects, objects, and features of the present invention will be understood and appreciated by those skilled in the art upon studying the following specification, claims, and appended drawings.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in FIGS. 2-6. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Vehicle 1 includes a door 2 and a roof 4 partially enclosing a passenger compartment 6. Door 2 includes a pane of moveable glass 8 that retracts within the door 2 to a window open position and extends above from the door 2 belt line to a window closed position, as is generally true of frameless door glass systems 10. Glass 8 is supported on a lower edge 12 by and attached to a lower glass rail 14. Lower glass rail 14 is operationally attached to window regulator assembly 16, which is in turn operated by regulator gear 18. Regulator gear 18 is actuated by a power assist electric motor 20, as is becoming common in the industry, operable via power window switch 22 mounted on the interior of the door.

As best shown in FIGS. 2-6, the frameless door glass system 10 also includes a weather seal 24 disposed within and attached to an inverted seal channel 26 mounted to the outer, lower edge 28 of the roof 4 that forms a lower door opening edge 30. As can be seen, seal channel 26 comprises an upper structural seal rail 32 and a lower structural seal rail 34. Extending substantially downwardly from outer edge 36 of the upper structural seal rail 32 is first rib 38 and extending substantially upwardly from inner edge 40 of the lower structural seal rail 34 is a second rib 42. Together, ribs 38 and 42 cooperate to form a recess 44 within which a seat 46 of the weather seal 24 is received and secured.

The weather seal 24 is preferably constructed of an elastomeric material, most preferably EPDM, and further comprises an inboard seal portion 48 and an outboard seal portion 50. The inboard seal portion 48 is disposed adjacent inner edge 40 of lower structural seal rail 34 and is provided with an extending edge 52 adapted to sealingly and resiliently engage the interior surface 58 of glass 8, as described below. The outboard seal portion 50 is disposed adjacent outer edge 36 of upper structural seal rail 32 and is preferably provided with a glass engaging surface 54 formed by the floor of a hollow cavity 56 in the outboard seal portion 50 that compressibly and resiliently engages an upper edge 60 of the glass 8.

The upper edge 60 of glass 8 is adapted to engage and seal with glass engaging surface 54, while extending edge 52 of the weather seal 24 is displaced inwardly by the interior surface of 58 of glass 8. Thus, as shown in FIGS. 2-6, as the glass 8 is raised to its closed position, the glass edge 60 displaces the glass engaging surface 54 upwardly into the hollow cavity 56 and displaces the extending edge 52 upwardly and inwardly so as to create an effective seal.

Figure 1:
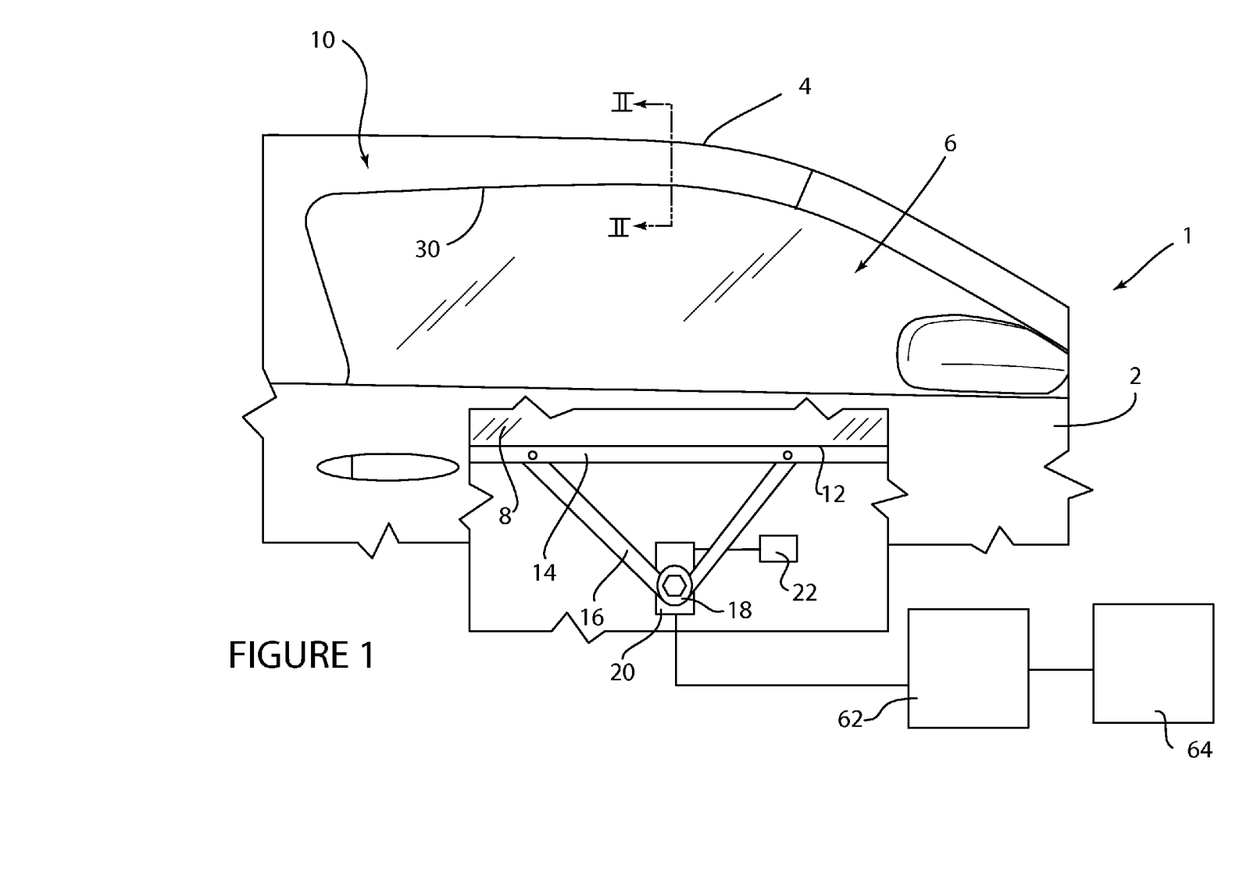
FIG. 1 is a side plan view of a motor vehicle capable of incorporating the window and interacting roof seal assembly in accordance with the present invention.
Figure 2:
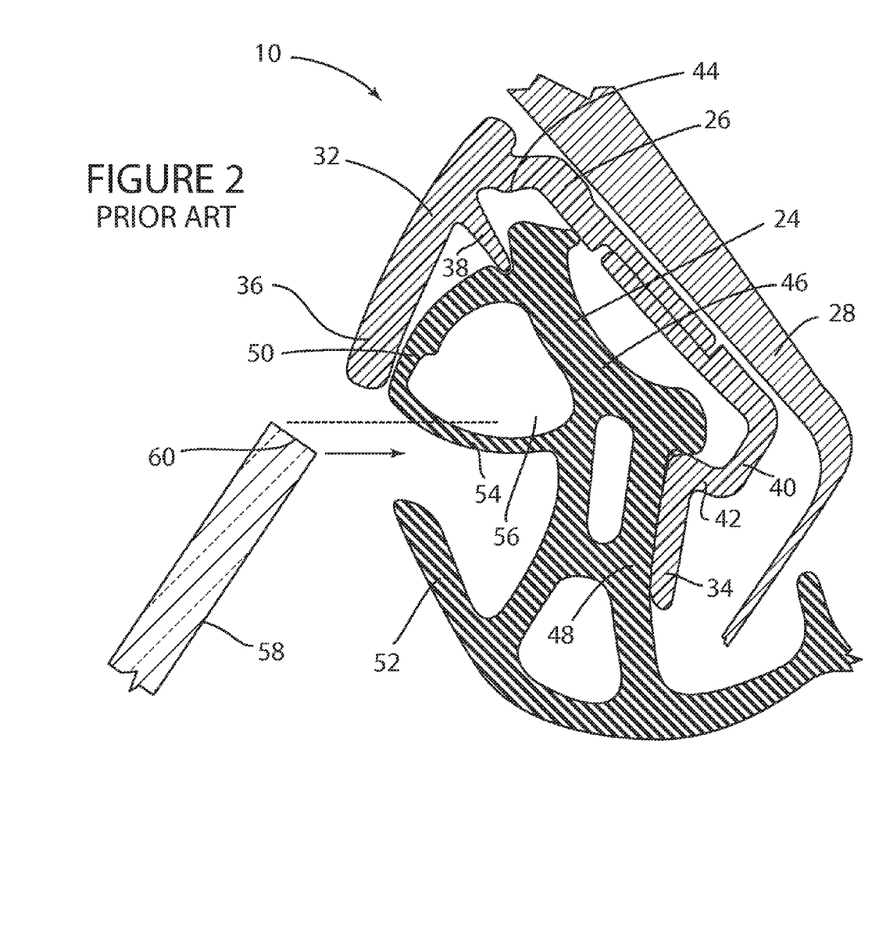
FIG. 2 is a cross-sectional view along the line II-II of FIG. 1 of a motor vehicle incorporating a window and interacting roof seal assembly in accordance with the prior art, with the door and door glass in the open position.
Figure 3:
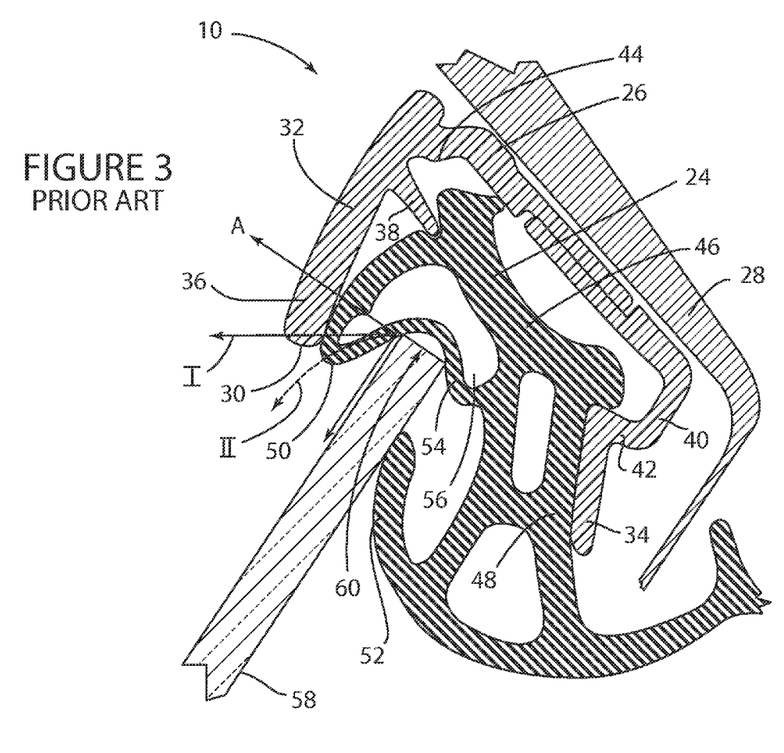
FIG. 3 is a cross-sectional view along the line II-II of FIG. 1 of a motor vehicle incorporating a window and interacting roof seal assembly in accordance with the prior art, with the glass in a first closed indexed position.
Figure 4:
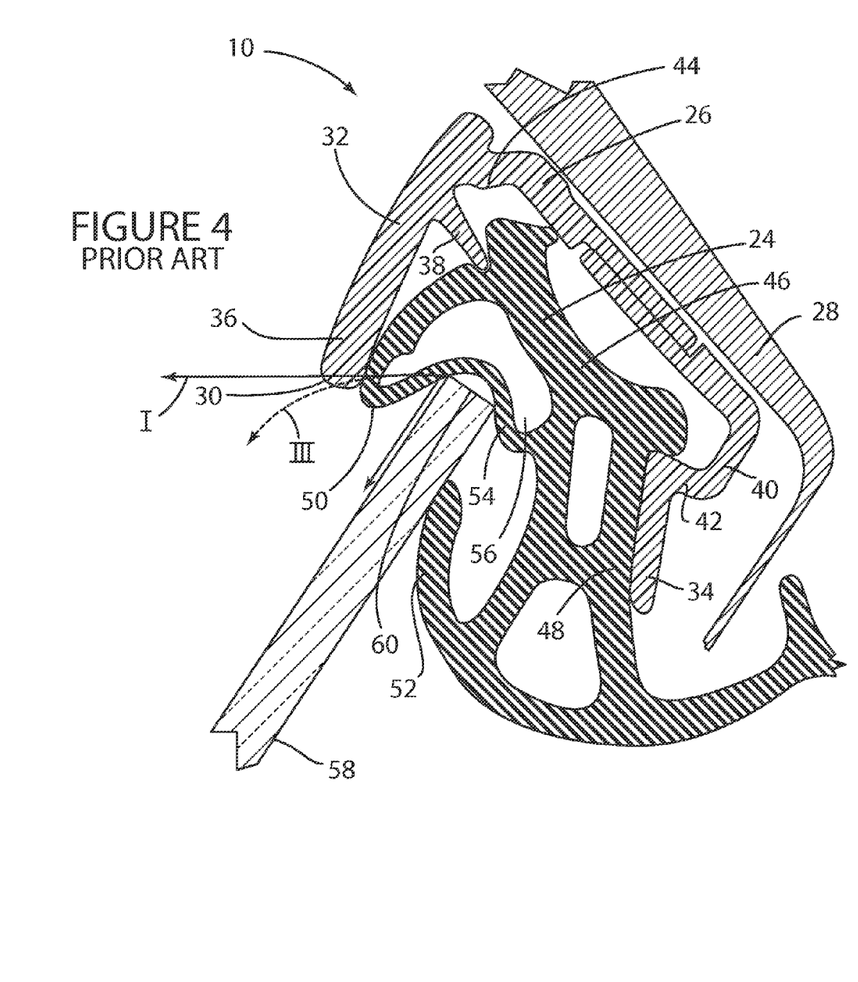
FIG. 4 is a cross-sectional view along the line II-II of FIG. 1 of the window and interacting roof seal assembly of the prior art, with the glass in a second closed indexed position.
Figure 5:
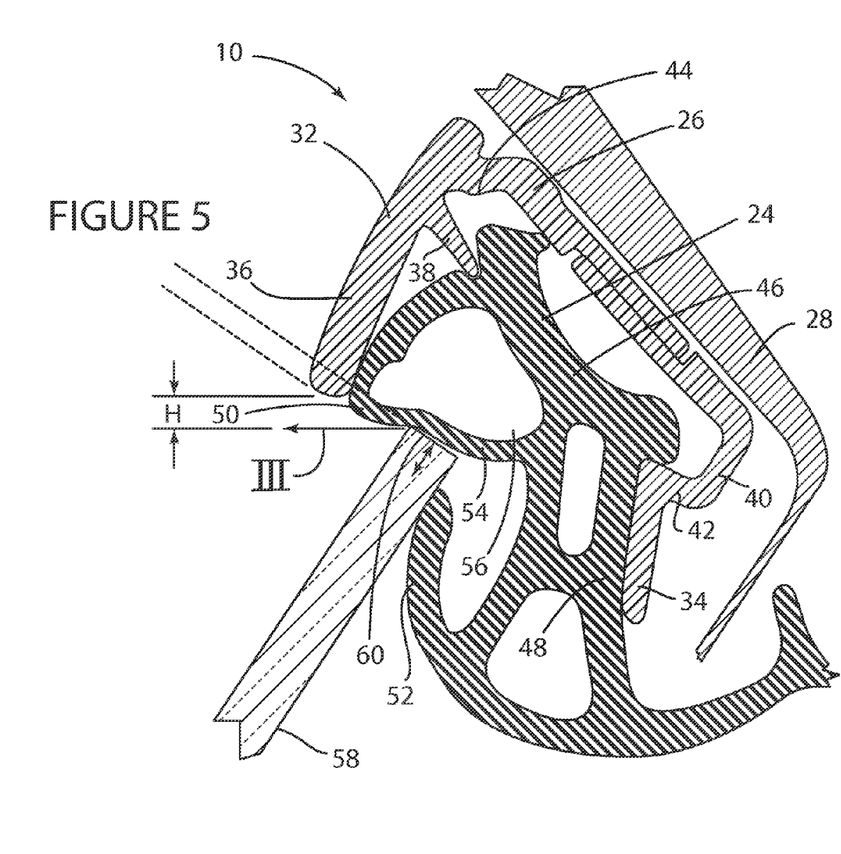
FIG. 5 is a cross-sectional view along the line II-II of FIG. 1 of a window and interacting roof seal assembly incorporating the present invention in the first stage of engagement.

As noted previously, some systems employ an "indexing" window regulator that drops the glass 8 a short distance when the door 2 is opened, then fully extends the glass to the closed position when the door 2 is closed, as shown in FIGS. 2-4. In such a system, the interference shown as arrow I, which is the path the upper edge 60 of the glass 8 normally would take, is avoided by the path of arrow II, which avoids the interference by slightly lowering the upper edge 60 of the glass 8 as the door 2 is opened.

However, interference may still occur with such indexed designs when the door 2 is opened too quickly, such that the door 2 and glass 8 are moved before activation of the system and before the upper edge 60 of the glass 8 is allowed to drop to a height that prevents physical interference between the outer edge 36 of the upper structural seal rail 32 and the upper edge 60 of the glass 8, as shown by the arrow III in FIG. 4.

Rather, according to the present invention, under conditions where the door 2 is likely to be opened, such as at a stop or at a low vehicle velocity, the glass 8 is always at an extended height relative the weather seal 24 such that the upper edge 60 of the glass 8 is allowed to pass out of the weather seal 24 without any interference with the outer edge 36 of the upper structural seal rail 32, or any other structure, without at all having to utilize an indexing function responsive to the door 2 being opened. At the same time, the present invention still provides adequate engagement between glass 8 and weather seal 24 structure under all conditions.

The present invention uniquely obtains this goal by presenting a frameless glass system with a two stage glass indexing system. The first stage sets the height of the upper edge 60 of the glass 8 to provide a vertical gap H to avoid all interference with the weather seal 24 and associated structure to provide good door openability and sealing function at low speeds. The second stage further engages the upper edge 60 of the glass 8 with the weather seal 24 when the vehicle is at highway speeds.

To obtain these beneficial objectives, the first stage of engagement may utilize a controller 62 operatively connected with the power assist electric motor 20 to directly or indirectly detect the force level exerted by the glass 8 against the weather seal 24. A preferred method of indirectly detecting this force level is by measuring changes in glass 8 speed, i.e., deceleration, as the glass 8 contacts the weather seal 24 derived from Hall Effect position sensors incorporated into the motor. The controller 62 thus causes the power assist electric motor 20 to stop the glass 8 from further motion upon detection of a predetermined deceleration. This predetermined deceleration is in turn calibrated to correspond to a first predetermined force level that repeatedly urges the upper edge 60 of the glass 8 against and displaces the glass engaging surface 54 upwardly into the hollow cavity 56 at a first predetermined force level to create an effective seal when the vehicle is at a stop or low vehicle speeds, yet at a height where the upper edge 60 of the glass 8 does not come into contact with the outer edge 36 when the door is opened. This results in a position for the glass 8 that moves clear of the weather seal 24 and outer edge 36 as the door 2 is opened, yet also provides limited and adequate weather seal 24 penetrations. An example of the first stage of engagement and the desired vertical gap H may be best seen in FIG. 5.

Other techniques for detecting the force level of the glass 8 against the weather seal 24 can be employed. For example, the torque exerted by the motor 20, again calibrated to a predetermined force level, can be measuring by measuring the current to the motor 20. Other methods may directly measure the force level through position sensors of the type used in window regulator systems having an indexing function.

Figure 6:
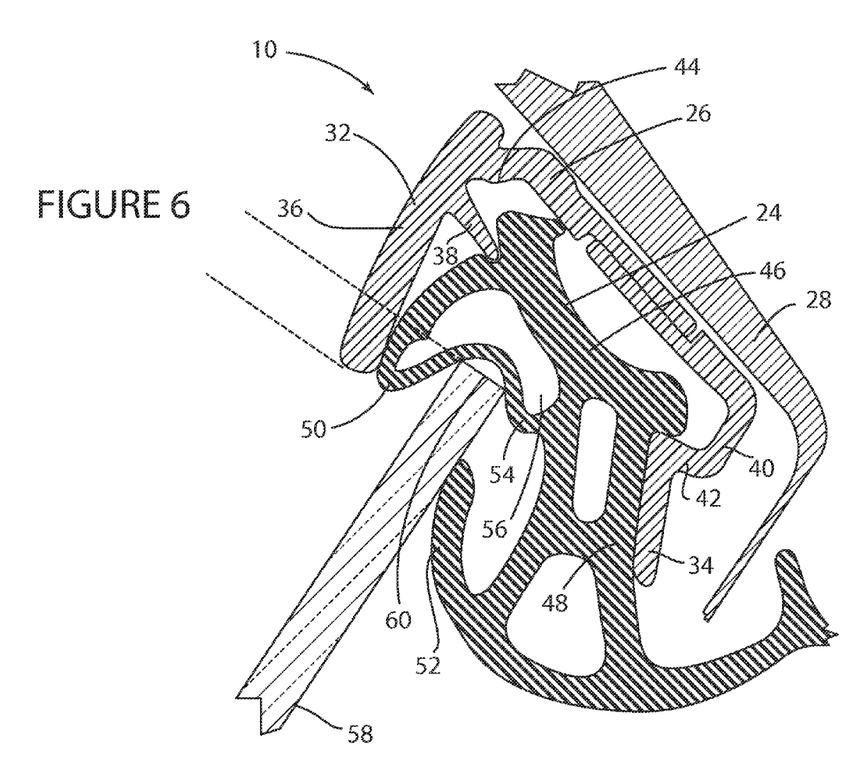
FIG. 6 is a cross-sectional view along the line II-II of FIG. 1 of the window and interacting roof seal assembly incorporating the present invention in the second stage of engagement.

The second stage is obtained by actuation of the power assist electric motor 20 by the controller 62 to the full stall torque of the motor 20 to further urge the upper edge 60 of the glass 8 against and further displace the glass engaging surface 54 upwardly into the hollow cavity 56 at a second predetermined force level to create an even more effective seal. This results in a higher position for the upper edge 60 of the glass 8 and provides significantly improved engagement between the glass 8 and weather seal 24, as shown in FIG. 6. Preferably, the second stage is triggered by achieving a first predetermined event, such as a predetermined vehicle speed, preferably at higher speeds, and more preferably at 80 MPH or above.

The input to the controller 62 to obtain the second stage may be provided by an appropriate sensing device 64, such as a speedometer. However, other sensing devices 64, such as a pressure sensor capable of measuring aerodynamic pressure on the outside of the glass 8, as shown by force arrow A in FIG. 3, can be used to determine vehicle speeds. Such glass aerodynamic pressure may be readily correlated with the vehicle speed. Other sensing devices can be used, such as an engine-on condition indicator and door lock activation indicator. Alternatively, the first predetermined event may be the detection of the power door locks in the locked condition.

In order to obtain good door openability after obtaining the second stage of engagement, but after the first predetermined event has passed or abated, the position of the upper edge 60 of the glass 8 must to be returned to its position in accordance with the first stage of engagement prior to there being any significant potential of the door 2 being opened. The preferred method for returning the glass 8 to the first stage of engagement is to lower the glass 8 past the first stage of engagement and then reclose the glass 8 until the first predetermined force level is obtained. Other methods may be used to lower the window from the second stage to the first stage, such as dropping the window a specified distance or time, or releasing the power drive mechanism to allow the seal pressure or gravity to lower the glass.

The trigger for this second predetermined event to reset the glass to the first stage of engagement is preferably a predetermined, relatively low vehicle speed, directly measured or determined from aerodynamic pressure. However, a variety of second predetermined events can be used to return the system to the first stage of engagement from the second stage of engagement, such as door unlock activation, engine off condition, etc.

The present invention thus provides improved resistance to aerodynamic loads at high speed and less wind noise by more firmly holding the glass 8 in place against the weather seal 24, while also providing good door openability, all in a system that is robust and durable, and without the added cost of extra hardware. In particular, the present invention takes advantage of the fact that the electrical components and physical hardware now required to achieve indexing and anti-trap systems, common on many vehicles with frameless door systems, can be adapted to perform the two stage glass engagement function proposed herein without significant added cost.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A motor vehicle having an openable door and a frameless door glass system comprising a moveable glass operable in two stages of contact and engagement with a weather seal disposed within a weather seal channel, and wherein the first stage provides a vertical clearance created between an uppermost portion of the moveable glass and an outboard lowermost portion of the weather channel prior to the door being opened and the second stage increases the engagement between the glass and weather seal relative the first stage upon detection of a predetermined event.

2. The motor vehicle of claim 1, wherein the motor vehicle further comprises a vehicle speed measuring device for directly or indirectly measuring the vehicle speed and the predetermined event is a vehicle speed above a predetermined vehicle speed.

3. The motor vehicle of claim 1, wherein the frameless door glass system further includes an operably coupled window regulator and window motor assembly for moving the glass up and down, the window regulator and window motor assembly being capable of detecting a force at which the glass engages the weather seal and the first stage of engagement is obtained by preventing the window regulator from further engaging the glass with the weather seal when a first predetermined force is obtained.

4. The motor vehicle of claim 3, wherein the second stage of engagement is obtained by actuating the window regulator to further engage the glass with the weather seal until a second predetermined force greater that the first predetermined force is obtained.

5. The motor vehicle of claim 4, wherein the second predetermined force is obtained upon full stall of the window regulator.

6. A motor vehicle having an openable door and a frameless door glass system comprising a moveable glass operable in two stages of contact and, engagement with a weather seal assembly having a weather seal channel and a weather seal disposed within the weather seal channel and a window regulator for moving the glass up and down, the frameless door glass system being capable of detecting a force at which the glass engages the seal assembly, wherein the first stage of engagement is obtained by preventing the window regulator from further engaging the glass with the weather seal when a first predetermined force is obtained between the glass and the weather seal to provide an opening clearance between an uppermost portion of the glass and an outboard lowermost portion of the weather seal channel prior to and as the door is being opened, and the second stage of engagement is obtained by actuating the window regulator to further engage the glass with the weather seal upon detection of a first predetermined event until a second predetermined force greater than the first predetermined force is obtained between the glass and the weather seal so as to increase the engagement between the glass and seal assembly.

7. The motor vehicle of claim 6, wherein the motor vehicle further comprises an aerodynamic pressure measuring device and the first predetermined event is an aerodynamic pressure below a predetermined aerodynamic pressure.

8. The motor vehicle of claim 6, wherein the motor vehicle further comprises a power door lock system for remotely locking and unlocking the door locks and the first predetermined event is the detection of the power door locks in the locked condition.

9. The motor vehicle of claim 6, wherein the motor vehicle further comprises a vehicle speed measuring device and the first predetermined event is a vehicle speed above a predetermined vehicle speed.

10. The motor vehicle of claim 9, wherein the predetermined vehicle speed is approximately 10 MPH.

11. The motor vehicle of claim 6, wherein the frameless door glass system is returned to the first stage of engagement from the second stage of engagement upon the occurrence of a second predetermined event.

12. The motor vehicle of claim 11, where the second predetermined event is door unlock activation.

13. The motor vehicle of claim 11, where the second predetermined event is the engine off condition.

14. The motor vehicle of claim 11, where the second predetermined event is a second predetermined vehicle speed.

15. The motor vehicle of claim 14, where the second predetermined vehicle speed is directly measured through a speedometer.

16. The motor vehicle of claim 14, where the second predetermined vehicle speed is determined from aerodynamic pressure.

17. A method of operating a moveable glass of a motor vehicle having an openable door and a frameless door glass system comprising the glass, a weather seal assembly comprising a weather seal channel and a weather seal disposed within the weather seal channel, and an operably coupled window regulator and window motor for moving the glass up and down in two stages of contact and engagement of the glass with the weather seal, the method comprising the steps of:

applying a first force at which the glass engages the weather seal to obtain a first stage of contact and engagement prior to the door being opened to provide a clearance created between an uppermost portion of the moveable glass and an outward lowermost portion of the weather seal channel; and applying a second force at which the glass further engages the weather seal, wherein the second force is higher than the first force, to obtain a second stage of contact and engagement so as to increase the engagement between the glass and weather seal upon detection of a predetermined event.

18. The method of claim 17, wherein the method further includes the step of detecting the force at which the glass engages the weather seal, wherein the first stage of contact and engagement is obtained by preventing the window regulator from further engaging the glass with the weather seal when a first predetermined force is obtained.

19. The method of claim 17, wherein the second stage of contact and engagement is obtained by actuating the window regulator to further engage the glass with the weather seal until a second predetermined force greater that the first predetermined force is obtained.

20. The method of claim 19, wherein the second predetermined force is obtained upon full stall of the window regulator.

* * * * *